United States Patent [19]

Jackson, Jr.

[11] 4,291,967
[45] Sep. 29, 1981

[54] POSITIVE LOCKING ADJUSTABLE MOUNT FOR CAMERA AND FLASH

[76] Inventor: Andrew H. Jackson, Jr., 808 Birch St., Collinsville, Ill. 62234

[21] Appl. No.: 190,922

[22] Filed: Sep. 26, 1980

[51] Int. Cl.³ .................. G03B 15/02; G03B 17/56
[52] U.S. Cl. .................................. 354/293; 362/8
[58] Field of Search ............... 354/126, 128, 129, 149, 354/145, 293; 362/3, 8, 9, 17, 18

[56] References Cited

U.S. PATENT DOCUMENTS

| | | | |
|---|---|---|---|
| 2,839,668 | 6/1958 | Mills | 362/8 |
| 3,893,145 | 7/1975 | King | 354/293 |
| 4,078,240 | 3/1978 | Kaneko et al. | 354/145 X |
| 4,091,402 | 5/1978 | Siegel | 354/293 |
| 4,198,150 | 4/1980 | Sloop | 354/293 |
| 4,255,036 | 3/1981 | Pincetich | 354/293 |

Primary Examiner—Donald A. Griffin
Attorney, Agent, or Firm—Kalish & Gilster

[57] ABSTRACT

The invention is an anatomically shaped hand grip assembly having a positive locking adjustment capability relative to a baseplate to which a camera may be secured, and a positive locking adjustable flashshoe mount on the top surface of the grip. The anatomical shaping of the grip is such as to comfortably accommodate the fingers and thumb of the hand holding the grip. The shaping further is such that the grip will be at an angle of about 45° with respect to each of two parallel planes in which the top and bottom surfaces, respectively, of the camera lie. The sloped relationship of the grip relative to the baseplate is maintained as the grip is rotated about an axis perpendicular to the baseplate. The grip can be positively locked into any one of a number of positions angularly located about said axis to permit comfortable wrist position as the user braces his arms against his body to provide steady camera support. The positive locking adjustable flashshoe mount at the top of the grip permits flash unit attachment relative to the positions of the grip and camera on the baseplate for forward-looking vertical and horizontal format photography.

10 Claims, 6 Drawing Figures

POSITIVE LOCKING ADJUSTABLE MOUNT FOR CAMERA AND FLASH

BACKGROUND OF THE INVENTION

There are many types of handgrips integral with or attachable to baseplates to which cameras may be mounted. Many contain photographic flash attachment shoe mounts either fixed permanently or adjustably to the top of the grip. Some have multiple shoe mounts affixed at right angles to each other in a fixed or adjustable arrangement with respect to the top of the grip.

Many handgrips currently available are configured for anatomical compatibility with regard to the hand and more specifically with regard to the fingers and thumb. At least one such grip in use is rotated slightly in the clockwise direction approximately 5° or 10° about the axis through the length of the grip perpendicular to the horizontal baseplate to which it is attached and tilted approximately 5° backward or counterclockwise in a vertical plane through the center of the grip at that position. This grip design reflects recognition of the fact that when, for example, the left arm is extended to grasp and hold a handgrip to which an article is mounted and to permit such article to be held directly in front of the body, the arm is rotated slightly clockwise, looking down, approximately 5° to 10° from straight ahead. The closed hand may have to turn slightly clockwise about the longitudinal axis through the wrist to hold a handgrip. Further, when the attached object such as a camera is to be held at chest level or above, the wrist may tend to rotate about the longitudinal axis counterclockwise. Thus, the handgrip described above is designed to accommodate a wrist rotation in each of two axes. The angular positions permitted are, however, quite limited and not generally within the most desirable range of positions for comfortable and, more importantly, stable holding and support of the attached object. An object such as a camera being supported by a baseplate attached to a handgrip must be held steady for focusing and shooting in order to achieve the desired focus, composition, and other photographic results.

The above described handgrip has two flashshoe mounts at 90° to each other on a cylindrical body which may be rotated to position the flashshoe mounts. The cylindrical body is restrained from rotation after the desired position is attained by securing it with a friction clamp tightened upon the cylindrical body by means of a tight thumb screw. The problem with this arrangement is that a moderately heavy to heavy flash unit mounted in one of the flash shoes may not remain in the desired position when the combined flash unit and grip is in other than the vertical, upright position. The friction grip may not provide a secure hold on the cylindrical body to which the flashshoe mount is attached. Thus, the flash unit may rotate out of proper position and result in loss of control of the photographic exposure process or damage to the flash unit itself.

Other handgrips are moderately shaped vertically mounted cylindrical types. These may have fixed or rotatable horizontally placed flashshoe mounts at the top surface of the grip. Many have adapters to permit location of the flash unit at various locations above and around the camera body. Some permit mount rotation to achieve bounce flash effects where the flash unit itself does not provide such a capability.

Another type of adjustable flashshoe mount and handgrip combination employs a ball and socket with friction grip. The flashshoe mount is secured to the ball. The ball is held in the socket located at the top of the handgrip. Here again, the problem is one of not having a positive locking means to ensure that the ball is immovable when a flash unit, particularly a moderately heavy one, is mounted in the flashshoe. Also, the ball and socket mount frequently is incapable of holding position when carrying a flash unit in other than an upright position directly above the handgrip. Further, ball and socket flashshoe mounts are susceptible, as are other friction grip positioning means, to detrimental wear effects.

Other types of adjustable handgrip and flashshoe mount combinations offer varying degrees of positioning flexibility by means of screw type or wingnut fasteners.

The present invention overcomes the deficiencies of the afore-mentioned devices and offers the high degree of handgrip and flashshoe mount positioning flexibility independently and with respect to each other with positive locking and positioning means that are vitally necessary to creative photographic employment.

SUMMARY OF THE INVENTION

In view of the foregoing, one object of the invention is to provide an anatomically correct handgrip and baseplate support combination which permits the steady and comfortable holding of a camera at eye level with the elbows braced against the body for support by permitting the wrist of the hand holding the grip to remain either uncocked in any plane of permissible rotation or to rotate minimally in one or more planes of permissible rotation, in either case remaining in such position without incurring strain and tiring during prolonged use.

Still another object of the invention is to provide an adjustable handgrip to permit the comfortable, secure, and steady holding of an attached camera for waist level operating applications employing a waist level view finder.

Another object of the invention is to provide a handgrip capable of being rotated about an axis perpendicular to the horizontal plane of its base surface in regular angular increments and positively locked at each of such angular positions to a baseplate which secures the handgrip to the base of a camera.

Another object of the invention is to provide a means for adjustably mounting a flash unit to the top of the grip so that the flash unit can be rotated in specific angular increments and positively locked at each incremental position.

Another object of the invention is to provide pushbutton activation of a positive locking incrementally adjustable flash shoe.

Still another object of the invention is to provide a combined means for holding a camera and flash unit relative to each other with independently operative, incremental, positive locking adjustment capabilities making possible secure, stable, and comfortable support of the combination for both horizontal and vertical format photography.

DETAILED DESCRIPTION OF INVENTION

Figure 1:
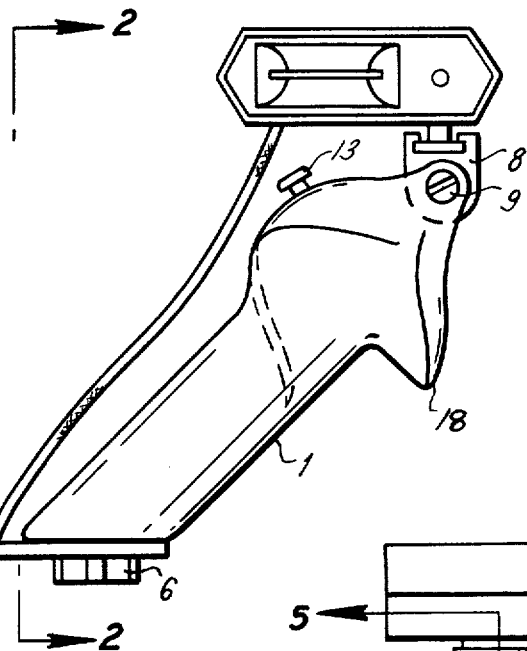
FIG. 1 is a front elevation view of the invention with a camera mounted on the baseplate and a flash unit mounted atop the handgrip.

To provide proper support for a camera having an eye level viewfinder, most authoritative texts recommend that the elbows be placed firmly against the body. This places the upper arms flat against the body to provide a support foundation for stability. With the lower arms brought into contact with the respective upper arms against the upper torso and the wrist uncocked, i.e., with the longitudinal axis of the wrist perpendicular to the major axis of the lower arm, the oblique palmar gritter will be at an angle of approximately 45° with the longitudinal axis of the wrist.

When the lower arm is raised toward the body, the wrist is naturally turned about the major axis of the lower arm so that the palm faces generally backwards toward the front of the body, the palmar gritter will most comfortably accommodate a handgrip at approximately a 45° angle in a vertical plane, in which the camera front and lens are located, perpendicular to the horizontal plane in which the base of the camera is located, i.e., a horizontal plane parallel to the ground.

The 45° angle the handgrip of the present invention makes in all cases in a vertical plane perpendicular to a horizontal plane parallel to the ground is the angle of the palmar gritter within the hand in the gripping mode when the wrist is uncocked, i.e., the longitudinal axis throught the wrist is perpendicular to the major axis of the lower arm. The wrist is not rotated either clockwise or counterclockwise about the lateral axis, front to back. The combination of the arms against the body and the untensioned wrist provide maximum stability and support with the least tiring load carrying capability.

The positive locking positions feature at the base of the handgrip permits angular rotational variations of the handgrip upon its mating baseplate to accommodate the physiological differences and personal preferences of users. Such differences may necessitate that the vertical plane in which the handgrip lies be rotated so that it is no longer parallel with the vertical planes in which the front and back of the camera lie, respectively.

When a camera with a waist level viewfinder is secured to the baseplate to which the handgrip is mounted, again the handgrip sloped at approximately a 45° angle with a horizontal plane parallel to the ground plane is the least tiring and offers the most comfort and stability. In this application, the upper arms are planted against the body. The lower arms are bent relative to the upper arms so that they are generally perpendicular to the front vertical plane of the body, i.e., they are approximately parallel to the ground plane.

In this relationship, with the longitudinal axis of the wrist perpendicular to the major axis of the lower arm, and at an angle of about 45° with the horizontal plane, the palmar gutter which encompasses the handgrip is at an angle of approximately 45° with said plane. The angle of the palmar gutter is not changed measurably if the lower arms are rotated about a vertical axis perpendicular to the horizontal ground plane to bring the hands closer together in front of the body to hold the camera. As described above, the positive locking angular adjustment feature at the bottom of the handgrip permits its rotation to accommodate such a variation.

It is only when a camera with a waist level viewfinder is to be critically focused and the camera is raised above waist level that the wrist must rotate slightly in adduction so that the longitudinal axis of the wrist is no longer perpendicular to the major axis of the lower arm.

The palmar gutter is at an angle relative to the major axis of the lower arm that is slightly less than 45°. The handgrip secured to a baseplate at an angle of approximately 45° relative to same necessitates the minor wrist rotation described above but such is well within the range of adduction of the hand and is less tiring to the hand than a vertically secured handgrip which would necessitate rotation of the wrist in the more limited range of abduction which subjects the wrist to more tension.

The handgrip of the subject invention has a top surface which extends over the main body of the grip as a contoured lip. The lip rests on and extends over the thumb-index finger arch of the hand. The lip extension over this arch prevents the handgrip from slipping out of the hand and contributes to the overall secure support of the camera and flash combination.

A pushbutton located at the front of the handgrip, slightly above the position of the index finger, controls the positive locking positioning mechanism contained in the upper part of the grip. The positive locking positioning mechanism secures the adjustable flashshoe mount in each of several available positions. The adjustable flashshoe mount thus permits flash unit positioning for forward illumination regardless of whether the camera is being held for horizontal or vertical format photographs.

DESCRIPTION OF THE PREFERRED EMBODIMENT

Figure 2:
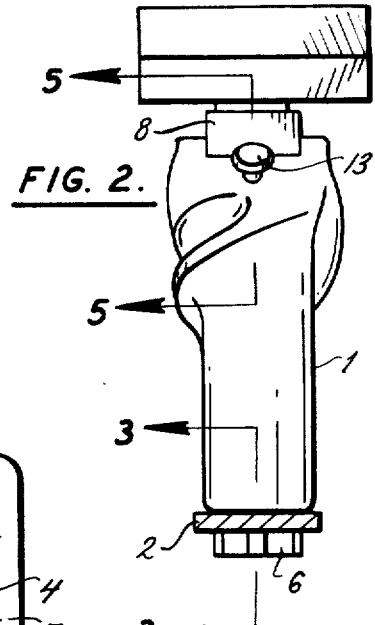
FIG. 2 is a side elevation view of the invention with the camera removed and a flash unit mounted on the handgrip.

FIG. 1 shows a typical arrangement of a camera secured to one end and the handgrip 1 of the subject invention attached to the opposite end of baseplate 2. The anatomical shaping of handgrip 1 is shown in both FIGS. 1 and 2.

Figure 4:
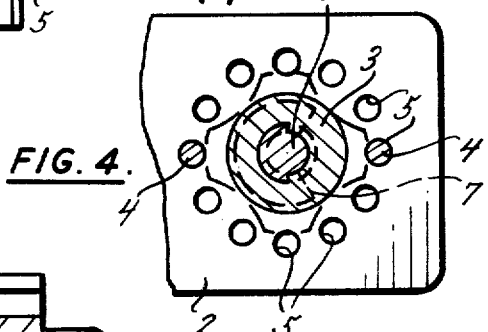
FIG. 4 is a fragmentary sectional view taken at line 4—4 in FIG. 3, the interface between the base of the handgrip and the baseplate of the invention.

A positive lock insert 3 having at least one positioning pin 4, but preferably a plurality of positioning pins 4, in a circular pattern about the centerpoint of the insert is molded into the base of handgrip 1. The preferred circular pattern of positioning pins 4 mate with a corresponding circular pattern of positioning guides 5 in baseplate 2 as shown in FIG. 4. It should be realized that positioning pins 4 could be located on baseplate 2 and positioning guides 5 could be located within insert 3 of handgrip 1 without substantially changing the positive locking positioning capability described. The preferred embodiment is, however, as first described above.

Figure 3:
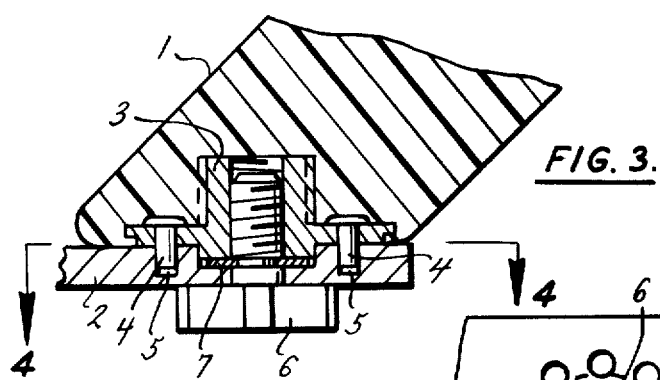
FIG. 3 is a front fragmentary sectional view of the handgrip and attached baseplate taken at line 3—3 in FIG. 2.

Base mounting bolt 6 is movably retained in a hole in baseplate 2 by means of retainer ring 7 as shown in FIGS. 3 and 4. When handgrip 1 is positioned to the right of the camera as shown in FIG. 1 and positioning pins 4 in positive lock insert 3 are mated in the appropriate positioning guides 5, base mounting bolt 6 is screwed into the mating threads of insert 3 to firmly secure handgrip 1 to baseplate 2.

Figure 6:
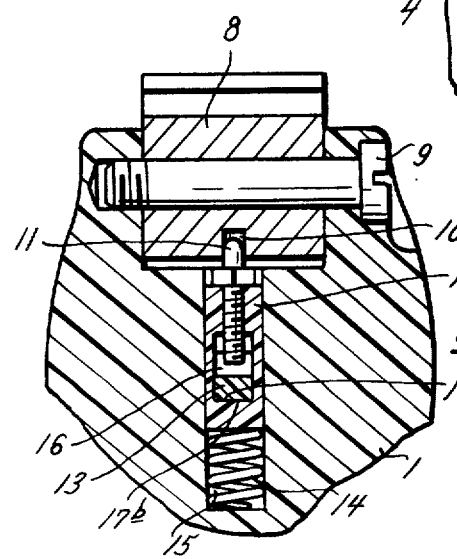
FIG. 6 is a fragmentary sectional view taken at line 6—6 of FIG. 5.
Figure 5:
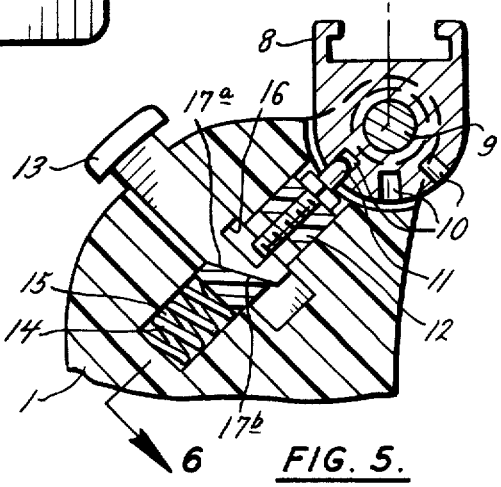
FIG. 5 is a front fragmentary sectional view taken at line 5—5 of FIG. 2.

Flashshoe mount 8 is secured to the top of handgrip 1 as shown in FIGS. 5 and 6 by means of pivot bolt 9 about which it can be rotated. Flashshoe mount 8 has positioning guides 10 located radially about the centerline of its cylindrically shaped underside. By pushing in on pushbutton 13, sloping face 17a on its bottom is caused to slide upon oppositely sloping face 17b internal to locking pin piston 12. Locking pin piston 12 is thus caused to travel downward against spring 14 within locking pin cylinder 15. Locking pin 11 threaded into the upper portion of locking pin piston 12 as shown in FIGS. 5 and 6 is thus withdrawn from the falsh mount positioning guide 10 in which it previously resided.

When locking pin 11 is thus moved downward and out of positioning guide 10, flashshoe mount 8 can be manually rotated to a new position. When a new position is selected, pushbutton 13 is released. Compressed spring 14 pushes upward upon the bottom of locking pin piston 12 causing it to move upward and push sloping face 17b of locking pin piston 12 upon the bottom sloped face 17a of pushbutton 13 resulting in its outward travel until the back face of slot 16 catches the bottom of locking pin 11 and stops the further withdrawal of pushbutton 13. Simutaneously, as piston 12 travels upward, locking pin 11 engages positioning guide 10 at the new position selected for flashshoe mount 8.

Contour lip 18 of handgrip 1 shown in FIG. 1 is shaped and large enough to ensure that a secure, comfortable hold can be maintained on the combined camera, baseplate, flash unit, and handgrip load acting downward. Lip 17 rests upon the thumb-index finger arch of the hand which imparts an upward acting force to counter the downward acting load.

Although the invention has been shown and described with respect to preferred embodiments thereof, it should be understood by those skilled in the art that the foregoing and various other changes and omissions in the form and detail thereof may be made therein without departing from the spirit and scope of the invention.

What I now claim is:

1. A photographic apparatus for holding a camera and a flash unit comprising in combination, a flashshoe having a positive locking positioning means, a baseplate having a positive locking positioning means, and a handgrip having a base on one end in a plane at about a forty-five degree (45°) angle to the longitudinal axis of the handgrip and having in said base of positive locking means permitting adjustable engagement with the positive locking positioning means in the baseplate at incremental angles about an axis perpendicular to said baseplate, and having at its opposite end a mating means for permitting rotational mounting of the flashshoe rotational means and mating positive locking positional means permitting adjustable engagement with the positive locking positioning means in the flashshoe, and further having a contoured lip on the same end as the means for engaging said flashshoe, said lip located on the side of the handgrip permitting it to rest upon the thumb-index finger arch of the user's hand holding the handgrip, such that said handgrip can be securely attached to the baseplate at about 45° angle to the plane in which the baseplate lies and at any one of a number of positions about an axis perpendicular to the baseplate to permit comfortable holding of a camera and the flashshoe can be incrementally positioned and positively locked to securely hold a flash unit relative to the baseplate mounted camera for either horizontal or vertical format photography.

2. The apparatus of claim 1 wherein the positive locking positioning means of said flashshoe permits incremental angular adjustments about an axis of rotation located equidistant from the sidewalls of the flashshoe below the plane in which the base of the flashshoe lies.

3. The apparatus of claim 2 wherein the positive locking positioning means of said flashshoe comprises a rotatable cylinder having at least two holes located substantially midway between its ends constituting female receptacles for the mating elements of the positive locking positioning means on the flashshoe end of said handgrip.

4. The apparatus of claim 1 wherein the positive locking positioning means in the flashshoe end of said handgrip is a movable male insert which mates with one of the female receptacles in the flashshoe cylinder.

5. The apparatus of claim 4 wherein the movable male insert is spring propelled into and held in a mating female receptacle in the flashshoe cylinder.

6. The apparatus of claim 4 wherein the movable male insert is removable from its mating position in a mating female receptacle in the flashshoe cylinder by a pushbutton on said handgrip operating an extraction means within said handgrip.

7. The apparatus of claim 1 wherein the positive locking positioning means of said baseplate comprises in combination at least one female receptacle for mating with a male insert protruding from the base of the handgrip, and a captive lock bolt located adjacent to said female receptacle at one end of the baseplate for mating with a threaded hole adjacent to the male insert located in the base of said handgrip so that when the handgrip and baseplate are coupled by mating said male insert with said female receptacle, the joinder may be secured by hand tightening the captive lock bolt in the baseplate with the threaded hole in the base of the handgrip.

8. The apparatus of claim 7 wherein the positive locking positioning means of said baseplate comprises in combination a plurality of female receptacles in a pattern compatible for mating with a matching pattern of male inserts protruding from the base of the handgrip.

9. The apparatus of claim 1 wherein the positive locking positioning means of said baseplate comprises in combination at least one male insert for mating with a female receptacle in the base of the handgrip, and a captive backbolt located adjacent to said male insert at one end of the baseplate for mating with a threaded hole adjacent to the female receptacle in the base of said handgrip so that when the handgrip and baseplate are coupled by mating said male insert with said female receptacle, the joinder may be secured by hand tightening the captive lock bolt in the baseplate with the threaded hole in the base of the handgrip.

10. The apparatus of claim 9 wherein the positive locking positioning means of said baseplate comprises in combination a plurality of male inserts for mating with a matching pattern of female receptacles in the base of said handgrip.

* * * * *